United States Patent Office 2,879,296
Patented Mar. 24, 1959

2,879,296

CHLORINATED KETONE SYNTHESIS

Erhard J. Prill, Dayton, Ohio, assignor to Monsanto Chemical Company, St. Louis, Mo., a corporation of Delaware No Drawing. Application July 26, 1955
Serial No. 524,599

8 Claims. (Cl. 260—591)

This invention relates to the synthesis of ketones; more particularly, it relates to the catalytic acylation of chlorinated aromatic hydrocarbons.

It is an object of this invention to provide a new process for the production of ketones. It is a further object of the present invention to provide a new process whereby halogenated diaryl ketones may be obtained. It is a further object of this invention to provide a catalytic process for the production of chlorinated aromatic ketones.

These and other objects of the present invention are provided by contacting a chlorinated aromatic hydrocarbon with an acylating agent in the presence of ferric chloride.

The halogenated aromatic hydrocarbons which may be acylated by the process of the present invention, comprise, for example, chlorobenzene, the chlorotoluenes, e.g., ortho-chlorotoluene and para-chlorotoluene, 5-chloro-meta-xylene, 1,5-dichloronaphthalene, ortho-dichlorobenzene, bromobenzene, para-bromotoluene, 2,4,6-trichlorobenzene, etc.

As acylating agents, there are preferably used in the present process aromatic carboxylic acid halides, the aromatic nucleus of which may be substituted or unsubstituted. As examples of acyl halides which contain only carbon and hydrogen in the aromatic radical may be listed such compounds as benzoyl chloride, benzoyl bromide, para-toluyl chloride, para-ethylbenzoyl chloride, α-naphthoyl chloride, 2,4-dimethylbenzoyl chloride, cumoyl chloride, 4-biphenylcarboxylic acid chloride, etc. Aromatic carboxylic halides in which the aromatic nucleus is substituted by groups which do not interfere in carrying out the process of the present invention include, for example, para-nitrobenzoyl chloride, ortho-nitrobenzoyl chloride, 3-nitro-para-toluyl chloride, anisoyl chloride, veratroyl chloride, 2 - methoxy-1-naphthoyl chloride, 4-(4-nitrophenoxy)benzoyl chloride, meta-chlorobenzoyl chloride, 3-bromo-para-toluyl chloride, etc. These acid chlorides are readily obtainable from the corresponding acids by methods well known in the art.

As examples of ketones which may be obtained in accordance with the present process, there may be listed, e.g., 2-chlorobenzophenone, 4-chlorobenzophenone, 3,4'-dichlorobenzophenone, 2,4-dichlorobenzophenone, 2,4'-dichlorobenzophenone, 3,4 - dichlorobenzophenone, 4,4'-dichlorobenzophenone, 2,4,6-trichlorobenzophenone, 4-bromobenzophenone, 3-bromo-4-chlorobenzophenone, 4-chloro-3'-methylbenzophenone, 4-chloro-4'-methylbenzophenone, 4-chloro-4'-ethylbenzophenone, 4-chloro-2',4'-dimethylbenzophenone, 3,4 - dichloro - 3' - methylbenzophenone, 4-bromo-4'-methylbenzophenone, 2,5-dichloro-3' - methylbenzophenone, 4 - chloro-2',6'-dimethylbenzophenone, 4-chloro-4'-sec-propylbenzophenone, naphthyl chlorophenyl ketone, 1,5-dichloro-8-naphthyl phenyl ketone, 1,5-dichloro-8-naphthyl meta-tolyl ketone, 4-chloro-4' - phenylbenzophenone, 4-chloro-3'-nitrobenzophenone, 4-chloro-4'-nitrobenzophenone, 4-chloro-4'-methyl-3'-nitrobenzophenone, 3,4'-dichloro-4-nitrobenzophenone, 4-chloro-3',4'-dimethoxybenzophenone, 4 - bromo-4'-methoxybenzophenone, 4-chloro-4'-ethoxybenzophenone, etc.

In carrying out the present process, the chlorinated aromatic hydrocarbon is simply contacted with the acid halide in the presence of ferric chloride until the reaction is complete. The reaction mixture is heated to accelerate the reaction; a convenient temperature is the reflux temperature of the reaction mixture, although the temperature of reaction may be varied, e.g., by variation of the pressure under which the reaction is carried out. Conveniently, the process is carried out at atmospheric pressure. The acid halide and hydrocarbon reactants condense in a 1:1 molar ratio in undergoing the present reaction and accordingly, equimolecular amounts of the two reactants may suitably be used in carrying out the process, or, if desired, an excess of the more readily available component may be used. Preferably, the reaction component present in excess may be the chlorinated aromatic hydrocarbon, since this also serves as a suitable diluent and solvent for the reaction, although the use of other solvents and diluents, such as petroleum hydrocarbon fractions boiling in the range of 100 to 200° C., is not excluded. The ferric chloride need be present only in catalytic amounts, i.e., from 1 percent or less, to 5 percent or more by weight of total reactants. The occurrence of condensation is evidenced by the evolution of hydrogen chloride, which preferably is removed continuously during the reaction. When reaction is complete, the product ketone is isolated, e.g., by extraction, distillation, etc., and any unreacted starting material which is recovered may be recycled, if desired. The process may be carried out as a batch or as a continuous process.

The invention is further illustrated, but not limited, by the following examples:

*Example 1*

A mixture consisting of 126.5 grams (1 mole) of ortho-chlorotoluene and 140.5 grams (1 mole) of benzoyl chloride was mixed with 5 grams of anhydrous ferric chloride and heated at the reflux temperature of the mixture for 4 hours. On fractional distillation, there were obtained 146 grams (63.3 percent yield) of 3-chloro-4-methylbenzophenone, boiling at 150–156° C./0.9 mm. The ketone, which in crude form melted at 67–73° C., was washed with ethanol and then recrystallized from ethanol, whereupon a melting point of 78.5–79.5° C. was obtained for the purified sample. The purified 3-chloro-4-methylbenzophenone analyzed as follows:

|  | Found | Calculated for $C_{14}H_{11}ClO$ |
|---|---|---|
| Percent C | 73.17 | 72.8 |
| Percent H | 5.07 | 4.77 |

*Example 2*

A mixture consisting of 170 grams (1.34 moles) of para-chlorotoluene, 188 grams (1.34 moles) of benzoyl chloride and 8 grams of anhydrous ferric chloride was heated for 5 hours, after which time hydrogen chloride evolution had substantially ceased. The reaction product was distilled, and there were obtained 195 grams (65 percent yield) of the 2,5-chloromethylbenzophenone, boiling at 130°–141° C./0.5 mm., $n_D^{25}$ 1.5970. The identification of the ketone as the product obtained was corroborated by analysis as follows:

|  | Found | Calculated for $C_{14}H_{11}ClO$ |
|---|---|---|
| Percent C | 73.22 | 72.8 |
| Percent H | 5.18 | 4.77 |

*Example 3*

A mixture consisting of mixed mono-chlorotoluenes weighing 126.5 grams (1 mole), 281 grams of benzoyl chloride (2 moles) and 5 grams of anhydrous ferric chloride was refluxed for the period during which hydrogen chloride was evolved; this was about 6 hours. On fractionation of the reaction product, some 200 grams of unreacted starting material were recovered and there were obtained 125 grams, a 54.3 percent yield, of mixed chloromethylbenzophenones, boiling in the range of 142–145° C. at less than 0.5 mm.

*Example 4*

To a flask were charged 294 grams (2 moles) of orthodichlorobenzene, 140.5 grams (1 mole) of benzoyl chloride, 20 grams of ferric chloride and 10 grams of benzotrichloride. (The benzotrichloride was added during this run as a dehydrating agent to react with water present in the system; the benzotrichloride may be presumed to be hydrolyzed under these conditions to benzoyl chloride.) The reaction mixture was heated for 15 hours and then subjected to fractional distillation. After recovery of 228 grams of unreacted starting material, there were obtained 80 grams of ketone, of which a sample washed with ethanol melted at 98–100.5° C., the known M.P. of 3,4-dichlorobenzophenone.

The invention has been illustrated with reference to particular methods and processes. Other modifications will readily occur to those skilled in the art.

What is claimed is:

1. The process which comprises contacting a chlorinated aromatic hydrocarbon with an aromatic carboxylic acid halide in the presence of not more than about 5% by weight of total reactants but at least a catalytic amount of ferric chloride, and isolating from the resulting reaction mixture a halogen-substituted diaryl ketone.

2. The process which comprises contacting a chlorinated aromatic hydrocarbon containing from 6 to 15 carbon atoms and from 1 to 3 chlorine atoms with an aromatic monocarboxylic acid chloride in the presence of not more than about 5% by weight of total reactants but at least a catalytic amount of ferric chloride and isolating from the resulting reaction mixture a chlorinated diaryl ketone.

3. The process which comprises forming a mixture of a chlorinated aromatic hydrocarbon containing from 6 to 15 carbon atoms and from 1 to 3 chlorine atoms with an aromatic monocarboxylic acid halide and not more than about 5% by weight of total reactants but at least a catalytic amount of ferric chloride; heating the mixture to a temperature at which hydrogen chloride is evolved therefrom to form an acylation reaction product of the said chlorinated hydrocarbon; and recovering from the resulting reaction mixture the said acylation reaction product.

4. The process which comprises contacting a dichlorobenzene with an aromatic carboxylic acid chloride and not more than about 5% by weight of total reactants but at least a catalytic amount of ferric chloride, and isolating from the resulting reaction mixture a dichlorophenyl aryl ketone.

5. The process which comprises contacting orthodichlorobenzene with benzoyl chloride in the presence of not more than about 5% by weight of total reactants but at least a catalytic amount of ferric chloride and isolating from the resulting reaction mixture 3,4-dichlorobenzophenone.

6. The process which comprises contacting a chlorotoluene with an aromatic monocarboxylic acid chloride in the presence of not more than about 5% by weight of total reactants but at least a catalytic amount of ferric chloride, and isolating from the resulting reaction product a methylchlorophenyl aryl ketone.

7. The process which comprises contacting orthochlorotoluene with benzoyl chloride in the presence of not more than about 5% by weight of total reactants but at least a catalytic amount of ferric chloride and isolating from the resulting reaction product 3-chloro-4-methylbenzophenone.

8. The process which comprises contacting para-chlorotoluene with benzoyl chloride in the presence of not more than about 5% by weight of total reactants but at least a catalytic amount of ferric chloride, and isolating from the resulting reaction product a ketone selected from the class consisting of 2-methyl-5-chlorobenzophenone and 2-chloro-5-methylbenzophenone.

References Cited in the file of this patent

UNITED STATES PATENTS 2,182,786    Coleman et al. _____ Dec. 12, 1939

OTHER REFERENCES

Wertyporoch et al.: Ber. Deut. Chem., vol. 66, pp. 1232–1238 (1933).

Thomas: Anhydrous Aluminum Chloride in Organic Chemistry, pp. 216, 217, 225 and 226 (1941).